United States Patent
Elliott et al.

(10) Patent No.: US 6,931,730 B2
(45) Date of Patent: Aug. 23, 2005

(54) METHOD OF MAKING A VEHICLE BODY

(75) Inventors: Adrian Nicholas Alexander Elliott, Dearborn, MI (US); Kimberly Ann Lazarz, Ypsilanti, MI (US); Matthew John Zaluzec, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 161 days.

(21) Appl. No.: 10/457,746

(22) Filed: Jun. 9, 2003

(65) Prior Publication Data

US 2004/0244172 A1 Dec. 9, 2004

(51) Int. Cl.[7] .............................................. B23P 17/00
(52) U.S. Cl. ...................... 29/897.2; 29/29; 29/407.01; 29/407.05; 29/445; 29/525.01; 29/525.13; 156/91; 296/203.01
(58) Field of Search ................................ 29/897.2, 445, 29/407.01, 407.05, 407.09, 407.1, 525.01, 525.02, 525.11, 525.13, 787, 795, 564.2, 524.1; 156/66, 91, 295; 296/203.01

(56) References Cited

U.S. PATENT DOCUMENTS

| | | | | |
|---|---|---|---|---|
| 5,213,386 A | * | 5/1993 | Janotik et al. ................. | 296/29 |
| 5,314,280 A | * | 5/1994 | Gagliardi et al. ............ | 411/182 |
| 5,458,393 A | * | 10/1995 | Benedyk ................. | 296/203.01 |
| 6,282,790 B1 | * | 9/2001 | Jaekel et al. ................ | 29/897.2 |
| 6,438,842 B1 | * | 8/2002 | Raami ........................ | 29/897.2 |
| 6,493,930 B1 | * | 12/2002 | Raami .......................... | 29/783 |

OTHER PUBLICATIONS

GESIPA® Fasteners USA, Inc.

Bollhoff Rivkle® Blind Rivet Nuts and Studs.

Jay–cee Sales & Rivet, Inc.

* cited by examiner

*Primary Examiner*—Jermie E. Cozart
(74) *Attorney, Agent, or Firm*—Raymond L. Coppiellie; Brooks & Kushman P.C.

(57) ABSTRACT

A method of securing body panels to a space frame for a vehicle is disclosed. The body panels are secured to rivet nuts that are assembled to frame members. The location of the rivet nuts or rivet nuts supporting surface is measured and the rivet nuts are milled or machined to correspond to reference body coordinates. The milled rivet nuts function as a integral shim pack and obviate the need for shims between the space frame and body panels.

8 Claims, 3 Drawing Sheets

METHOD OF MAKING A VEHICLE BODY

BACKGROUND OF THE INVENTION

1. Field of the Invention

The present invention relates to a method of manufacturing a vehicle body on a space frame using specialized fasteners to form an integral shim between body panels and the space frame.

2. Background Art

Vehicles may be manufactured on a conventional frame, a space frame or with an integral frame (unibody construction). Conventional frames have a chassis at the base of the vehicle body to which body panels are secured by welding or fasteners. A space frame vehicle has a cage-like frame to which body panels are secured with fasteners. A unibody vehicle has frame components formed into the floor pan and other body panels. The present invention focuses on solving problems relating to the manufacture of space frame vehicles.

Space frame vehicles are built on a space frame to which body panels are attached. Variations in manufacturing space frames is caused by part tolerance stack up, heat distortion or other reasons. Space frames may be warped, twisted, or otherwise not in conformance with body locator specifications. If the frame does not conform to body locator specifications, it may be difficult or impossible to accurately and securely fasten body panels to the space frame. The prior art relied upon the use of shims or shim packs to fill gaps and provide a good fit between body panels and the space frame to compensate for space frame variations.

The use of shims or shim packs in manufacturing a space frame vehicle is a laborious process. Gaps between body panels and space frame fastener mounting locations must be measured and shims must be selected that are of the proper height to fill any gaps. The shims then must be inserted while the body panel is secured to the space frame. The use of shims is also somewhat inaccurate since it relies upon manual measurements and the judgment of assembly line personnel to select the proper shim size. If a shim is not the correct size it may become loose or even fall out. If this happens the body and space frame may suffer from unnecessary noise and vibration.

There is a need for a cost effective and precise method of manufacturing a vehicle using a space frame that eliminates the use of shims. There is also a need for an automated manufacturing system for accurately and securely locating body panels on a space frame.

The above problems and needs are addressed by applicant's invention as summarized below.

SUMMARY OF THE INVENTION

According to one aspect of the present invention, a method of making a body of a vehicle with a space frame is provided. The method includes forming the space frame for the vehicle with spaced apart holes on a body panel receiving surface to which a body panel is attached. The location of the body panel receiving surface is measured to determine measured body coordinates that are compared to reference body coordinates. The next step in the process is to insert rivet nuts into the spaced apart holes on the body panel receiving surface of the space frame. The rivet nuts have a head portion that has a top surface. The rivet nuts also have an integrally formed fastener receptacle. The head portions of the rivet nuts are milled or otherwise machined to reduce the spacing between the top surface of the heads and the body panel receiving surface of the space frame. The milling operation corrects deviations between the measured body coordinates and the reference body coordinates. Body panels are then assembled to the rivet nuts by inserting a fastener through the panel and into the fastener receptacle. The body panel is secured against the top surface of the head portion of the rivet nut after the head portion has been machined to correspond to the reference body coordinates.

Alternatively, the method described above may be practiced by first inserting the rivet nuts into the holes and then measuring the location of the top surface of the rivet nut to determine body coordinates of the top surface of the rivet nuts instead of determining the measured body coordinates of the body panel receiving surface. After the top surface of the rivet nut is measured the head portion of the rivet nuts may be milled to reduce the thickness of the head of the rivet nuts to correct for deviation between the measured body coordinates of the top surface of the rivet nuts and the reference body coordinates thereof. The body panels are then assembled to the rivet nuts after milling as described above.

According to other aspects of the method of the present invention the method may also include the step of applying an adhesive to the body panel receiving surface to bond the body panel to the body panel receiving surface. The measuring step may be performed on a coordinate measuring machine and a milling step may be performed on a computer numerically controlled milling machine.

According to another aspect of the present invention a specialized rivet nut is provided that includes a head having a first portion of sufficient thickness to be secured to a supporting member and an integral second portion that is stacked on top of the first portion and is selectively removable by a material removal process. A tubular portion of the rivet nut extends from one side of the head and a fastener receiving opening is provided through the head and the tubular portion.

According to other aspects of the invention as it relates to the rivet nut, the tubular portion may be provided with a pin that is removably disposed within the tubular portion and is drawn axially through the opening to deform the tubular portion and secure the rivet nut to the supporting member. The fastener receiving opening is preferably threaded to receive a threaded fastener.

The above aspects of the invention and other aspects will be apparent in view of the attached drawings and following detailed description.

DETAILED DESCRIPTION OF THE PREFERRED EMBODIMENT(S)

Figure 1:
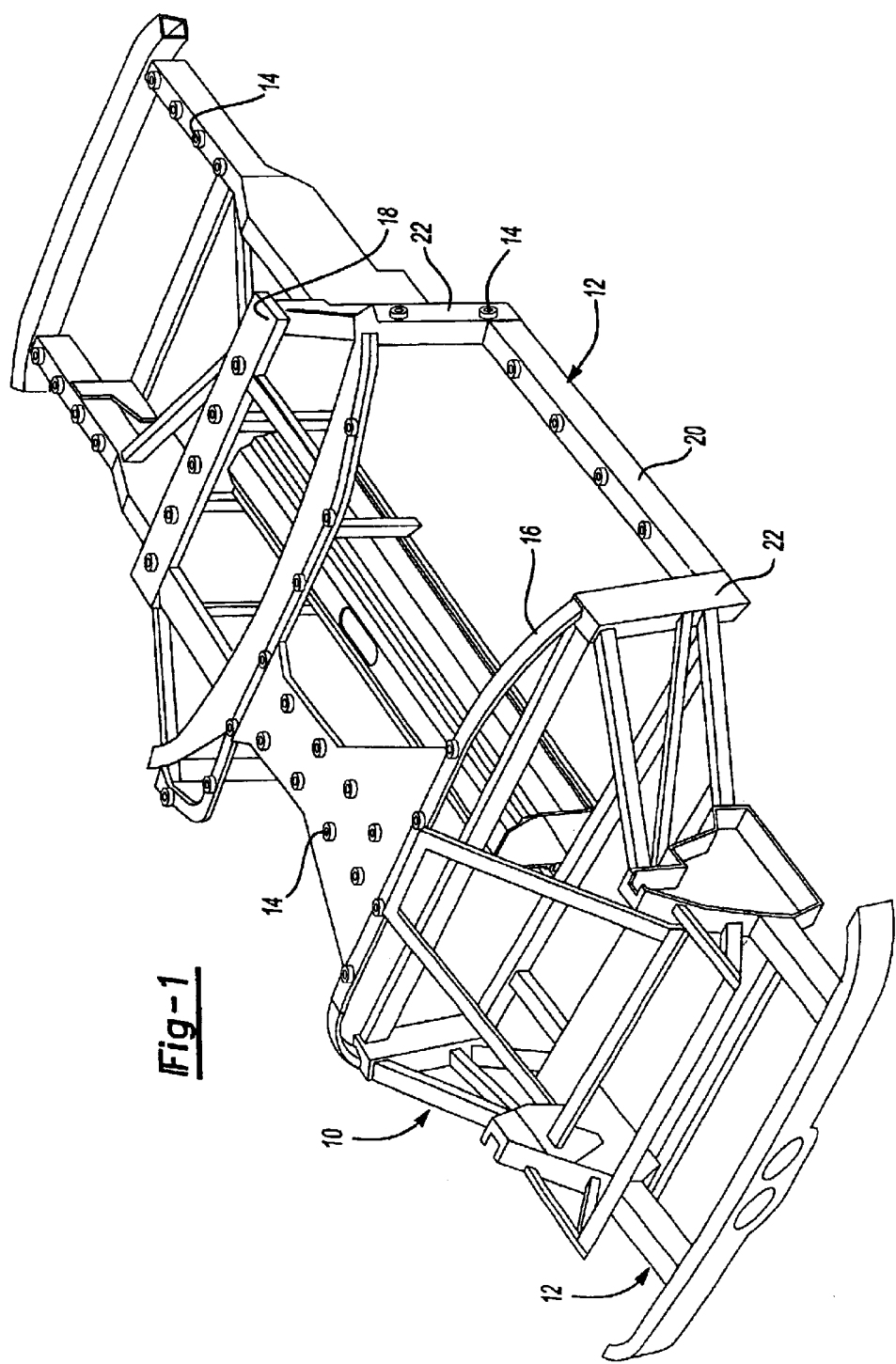
FIG. 1 is a perspective view of a space frame with rivet nuts made according to the present invention assembled thereto.

Referring to FIG. 1, a space frame is generally indicated by reference numeral 10. The space frame 10 is formed in part by a plurality of frame members 12, or other rigid beams. Rivet nuts 14 comprise specialized fastening elements that may be secured to a supporting member in a manner similar to how a pop rivet is secured and also includes a nut or head portion that is adapted to receive a threaded fastener. The space frame 10 has a rear transverse beam 16 and front transverse beam 18 that form part of the top of the space frame 10. A rocker panel beam 20 and body pillars 22 also form part of the space frame 10. Rivet nuts 14 may be seen on the transverse beams 16 and 18, rocker panel beam 20, and body pillars 22.

Figure 2:
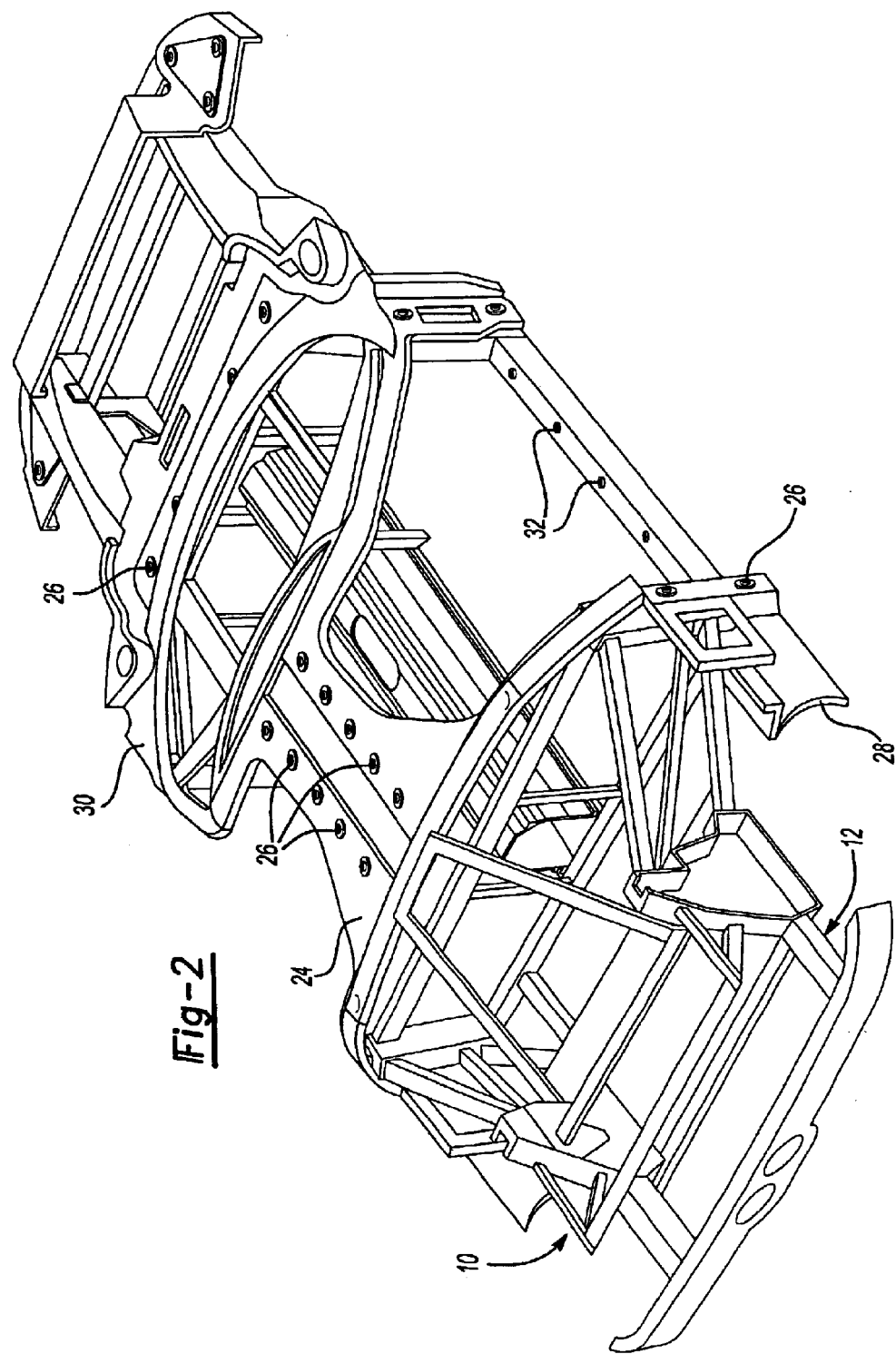
FIG. 2 is a perspective view of a space frame corresponding to the space frame shown in FIG. 1 with some of the body panels assembled to the space frame.

Referring to FIG. 2, a space frame 10 is illustrated with some of the body panels secured to the space frame 10. A roof panel 24 is shown secured to the rear transverse beam 16 and other parts of the space frame 10 by means of a plurality of bolts 26. A side body panel 28 is shown secured to a body pillar 22 by means of two of the bolts 26. Several front body panels 30 are secured to the front transverse beam 18 and other portions of the space frame 10. Machined rivet nuts 32 are visible in FIG. 2 on the rocker panel beam 20.

Figure 3A:
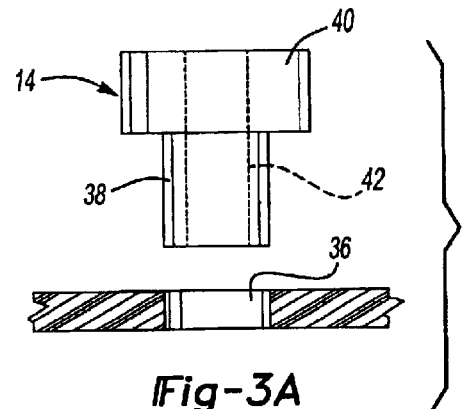
FIGS. 3A–C are a sequence of schematic elevation views partially in cross-section showing a sequence of steps for securing a rivet nut to a supporting member and fastening a body panel to the rivet nut.

The structure and function of the rivet nuts 14 and machined rivet nuts 32 will be described below with reference to FIGS. 3A–C, and 4. Referring to FIG. 3A, a frame member 12 is shown with a rivet nut 14 positioned above a hole 36 in the frame member 12. A tubular portion 38 of the rivet nut 14 extends from one side of the head 40 of the rivet nut 14. A fastener receiving opening 42 is shown in phantom in FIG. 3A.

Figure 3B:
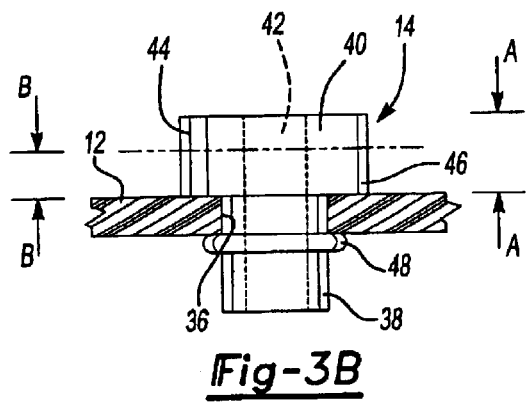

Referring to FIG. 3B, the rivet nut 14 is shown secured to the member 12 with the tubular portion 38 extending through the hole 36. The head 40 is enlarged to provide a millable portion 44 that may be selectively machined or milled off to provide a integral shim as part of the rivet nut 14. An abutting portion 46 of the head 40 abuts the member 12 and locks the fastener to the member 12 in conjunction with a locking rib 48 that is formed from the tubular portion 38. The millable portion 44 of the head 40 is illustrated by reference to the arrows A–A. For example, the head 40 could be 7 mm in height with a millable portion being provided that is 6 mm in height. If the entire millable portion 44 is removed, it would leave a head having a height of 1 mm. The arrows B–B in FIG. 3B indicate a shim dimension that may be provided if the head 40 is milled to the height indicated by the phantom line in FIG. 3B. The amount of material that must be removed from the head 40 is determined based upon a comparative measurement of reference body coordinates to either the height of the panel receiving surface on which the rivet nuts 14 are assembled or based upon the height of the top surface of the head 40 for each rivet nut 14. As shown in FIG. 3, the portion of the head 40 remaining after milling could be, for example, 4 mm. The rivet nut in this instance would function as a 4 mm shim above the member 12.

Figure 3C:
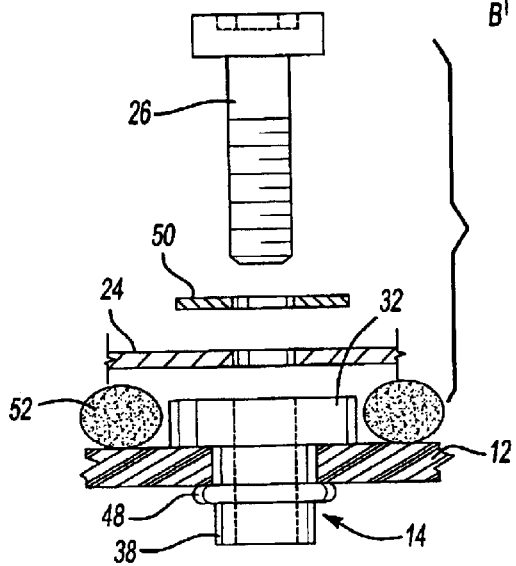

Referring to FIG. 3C, a machined rivet nut 32 is shown secured to a frame member 12 after it has been machined to the height designated in FIG. 3B. The machined rivet nut 32 is secured to the frame member 12 by the locking rib 48 formed on the tubular portion 38. The fastener or bolt 26 is shown poised above a washer 50 and a panel such as the roof panel 24. The fastener 26 secures the panel 24 to the machined rivet nut 32. The washer 50 broadens the footprint and spreads the load applied by the fastener 26. A bead of adhesive 52 is shown schematically. The adhesive 52 is applied to the frame member 12 by extruding a bead on a frame member 12 between and adjacent to the machined rivet nuts 32. Preferably, a continuous bead is formed on the frame members 12 between adjacent machined rivet nuts 32 to further secure and seal the panels 24, 28, 30, and the like to the frame members 12. The bead of adhesive 52 may be of somewhat greater height than the height of the machined rivet nuts 32 so that when the panel 24 is assembled, the adhesive spreads out and fills the space between the panel 24 and frame member 12.

Figure 4:
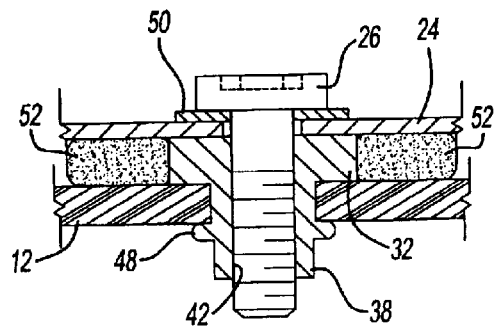
FIG. 4 is a cross-sectional view showing a body panel secured to a space frame by means of a rivet nut and an adhesive.

Referring to FIG. 4, a fully assembled fastener 26 and milled rivet nut 32 are shown securing a body panel 24 to a frame member 12. The fastener 26 may be a self-threading screw or may be a threaded bolt. If a self-threaded screw is used, it may not be necessary to form threads on the fastener receiving opening or receptacle 42. However, if a threaded bolt 26 is used, threads may be formed on the inner diameter. The milled rivet nut 32 retains the panel 24 through the washer 50 while the milled rivet nut 32 is securely locked by the locking rib 48 to the frame member 12. Adhesive 52 is squeezed to fill the gap between the panel 24 and the frame member 12.

While the best mode for carrying out the invention has been described in detail, those familiar with the art to which this invention relates will recognize various alternative designs and embodiments for practicing the invention as defined by the following claims.

What is claimed:

1. A method of making a body of a vehicle, comprising:

forming a space frame for a vehicle having spaced apart holes on a body panel receiving surface to which at least one body panel is to be attached;

measuring the location of the body panel receiving surface of the space frame to determine body coordinates and comparing the measured body coordinates to reference body coordinates;

inserting rivet nuts into the holes, the rivet nuts each having a head portion that has a top surface and a fastener receptacle;

milling the head portions of the rivet nuts to reduce the spacing between the top surface of the heads and the body panel receiving surface of the space frame to correct for deviations between the measured body coordinates and the reference body coordinates; and assembling the at least one body panel to the rivet nuts by inserting a fastener through the panel and into the fastener receptacle, whereby the body panel is secured against the top surface of the head portion of the rivet nut after the head portion has been milled to correct for deviations.

2. The method of claim 1 further comprising applying an adhesive to the body panel receiving surface to bond the at least one body panel to the body panel receiving surface.

3. The method of claim 1 wherein the measuring step is performed on a coordinate measuring machine.

4. The method of claim 1 wherein the milling step is performed on a computer numerically controlled milling machine.

5. A method of making the body of a vehicle, comprising:

forming a space frame for a vehicle having spaced apart holes on a body panel receiving surface to which at least one body panel is to be attached;

inserting rivet nuts into the holes, the rivet nuts each having a head portion that has a top surface and a fastener receptacle;

measuring the location of the top surface to determine body coordinates and comparing the measured body coordinates to reference body coordinates;

milling the head portions of the rivet nuts to reduce the thickness of the heads of the rivet nuts to correct for deviations between the measured body coordinates and the reference body coordinates; and assembling the at least one body panel to the rivet nuts by inserting a fastener through the panel and into the fastener receptacle, whereby the body panel is secured against the top surface of the head portion of the rivet nut after the head portion has been milled to correct for deviations.

6. The method of claim 5 further comprising applying an adhesive to the body panel receiving surface to bond the at least one body panel to the body panel receiving surface.

7. The method of claim 5 wherein the measuring step is performed on a coordinate measuring machine.

8. The method of claim 5 wherein the milling step is performed on a computer numerically controlled milling machine.

* * * * *